United States Patent
Kondou et al.

(10) Patent No.: US 6,660,372 B1
(45) Date of Patent: Dec. 9, 2003

(54) RESIN COMPOSITION FOR A NON-WOVEN FABRIC-LIKE DESIGN AND PROCESS FOR PRODUCING A MOLDED ARTICLE OF A RESIN HAVING A NON-WOVEN FABRIC LIKE DESIGN

(75) Inventors: Masaki Kondou, Aichi (JP); Isamu Yamaguchi, Nagoya (JP); Masaki Mizuno, Nisshin (JP); Nobuhiko Todaka, Toyota (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/535,228

(22) Filed: Mar. 24, 2000

(30) Foreign Application Priority Data

Mar. 29, 1999 (JP) .............................. 11-085156
Aug. 9, 1999 (JP) .............................. 11-225769

(51) Int. Cl.⁷ .................. B32B 27/04; B32B 27/12; B32B 18/00; B32B 5/16
(52) U.S. Cl. ................. 428/297.4; 428/298.4; 428/299.1; 428/323; 428/327
(58) Field of Search ............ 428/297.4, 298.4, 428/323, 327, 299.1

(56) References Cited

U.S. PATENT DOCUMENTS

| | | | |
|---|---|---|---|
| 4,868,038 A | * | 9/1989 | McCullough, Jr. et al. . 428/222 |
| 5,723,522 A | | 3/1998 | Bergmann |
| 5,750,620 A | * | 5/1998 | Davies et al. ................. 525/67 |
| 6,019,923 A | | 2/2000 | Pelzer |

FOREIGN PATENT DOCUMENTS

| | | |
|---|---|---|
| EP | 596378 | 10/1993 |
| EP | 576971 | 1/1994 |
| JP | 51-123248 B | 10/1976 |
| JP | 6-74550 B2 | 9/1994 |
| JP | 7-18097 B2 | 3/1995 |
| JP | 8-118516 A | 5/1996 |
| JP | 8-118518 A | 5/1996 |
| JP | 2903420 B2 | 3/1999 |
| WO | WO 94/04358 | 3/1994 |

* cited by examiner

Primary Examiner—Terrel Morris
Assistant Examiner—Christopher L. Pratt
(74) Attorney, Agent, or Firm—Frishauf, Holtz, Goodman & Chick, P.C.

(57) ABSTRACT

A resin composition for producing a molded article having a surface which has an appearance of a non-woven fabric, which comprises fiber piles of carbonized polyacrylonitrile having a nitrogen content of 10% by weight or more or fiber piles of viscose rayon mass-colored with a pigment; a process for producing a molded article of a resin having a surface which has an appearance of a non-woven fabric which comprises mixing the resin composition with an uncolored resin and molding the prepared mixture; and a molded article produced by using the resin composition. The resin composition can be pelletized with stability and, when the resin composition is mixed with pellets of an uncolored resin and molded, the molded article shows excellent mechanical properties and durability for a long time, exhibits a non-woven fabric appearance with warmth and depth and has an excellent recycling property.

6 Claims, No Drawings

RESIN COMPOSITION FOR A NON-WOVEN FABRIC-LIKE DESIGN AND PROCESS FOR PRODUCING A MOLDED ARTICLE OF A RESIN HAVING A NON-WOVEN FABRIC LIKE DESIGN

BACKGROUND OF THE INVENTION

1. Field of the Invention

The present invention relates to a resin composition for a non-woven fabric-like design and a process for producing a molded article of a resin having a non-woven fabric-like design. More particularly, the present invention relates to a resin composition which can be pelletized with stability and, when the resin composition is mixed with pellets of an uncolored resin and molded in a mold having a pattern of fine roughness, provides a molded article which has excellent mechanical properties, weatherability and heat resistance and exhibits a non-woven fabric-like design with warmth and depth, and a process for producing the molded article.

2. Description of Related Art

Heretofore, non-woven fabrics are frequently used as interior materials for vehicles and houses. Non-woven fabrics exhibit an excellent design with warmth and depth due to the structure composed of entangled fibers. However, to use a non-woven fabric as an interior material, it is necessary that a substrate having a sufficient mechanical strength and a fixed shape is placed and a non-woven fabric is laminated to the substrate. This cause an increase in the operation procedure and cost inevitably increases. Moreover, when a non-woven fabric is laminated as an interior material of a vehicle using an adhesive and left for a long time, window glasses are occasionally clouded due to volatile matters.

When a molded article of a plastic is used as an interior material, the strength and the shape of the interior material can be selected in a considerably wide range. However, it is not easy that a molded article of a plastic is provided with such a pattern with warmth and depth as that of non-woven fabrics. Moreover, when a colored molded article of a plastic is prepared, it is frequently conducted that a resin composition containing coloring agents in a great concentration and prepared in advance is mixed with pellets of an uncolored resin in an amount 5 to 100 times as much as the amount of the colored resin composition and the prepared mixture is used for molding. It is not easy that a resin composition containing coloring agents in a great concentration is pelletized with stability.

From the standpoint of environmental protection and effective utilization of materials, recycling of various products are being urged in recent years. Therefore, it is important for resin compositions containing coloring agents that molded articles prepared by using the resin composition can be recycled.

SUMMARY OF THE INVENTION

The present invention has objects to provide a resin composition for a non-woven fabric-like design which can be pelletized with stability and, when the resin composition is mixed with pellets of an uncolored resin and molded, provides a molded article which shows excellent mechanical properties and durability for a long time, exhibits a non-woven fabric-like design with warmth and depth and has an excellent property for recycling, and a process for producing the molded article.

As the result of extensive studies by the present inventors to overcome the above problems, it was found that a resin composition for a non-woven fabric-like design which comprises fiber piles of carbonized polyacrylonitrile having a nitrogen content of 10% by weight or more and/or fiber piles of viscose rayon mass-colored with pigments can be pelletized with stability and, when the resin composition is mixed with an uncolored resin and molded, the molded article exhibits a non-woven fabric-like design with warmth and depth and has an excellent property for recycling. The present invention has been completed based on this knowledge.

The present invention provides:

(1) A resin composition for a non-woven fabric-like design which comprises fiber piles of carbonized polyacrylonitrile having a nitrogen content of 10% by weight or more and/or fiber piles of viscose rayon mass-colored with pigments;

(2) A resin composition described in (1), wherein the fibers piles have a size of 1 to 15 denier and a length of 0.1 to 2 mm;

(3) A resin composition described in any of (1) and (2), which comprises 5 to 20% by weight of the fibers piles;

(4) A resin composition described in any of (1), (2) and (3), which comprises 15 to 40% by weight of polypropylene, 15 to 40% by weight of polyethylene, 10 to 30% by weight of an ethylene-propylene elastomer, 1 to 10% by weight of polypropylene modified with an acid and 5 to 20% by weight of the fibers piles;

(5) A molded article produced by using a resin composition for a non-woven fabric-like design which is described in any of (1), (2), (3) and (4); and (6) A process for producing a molded article of a resin having a non-woven fabric-like design which comprises mixing a resin composition for a non-woven fabric-like design comprising 5 to 20% by weight of fiber piles of carbonized polyacrylonitrile having a nitrogen content of 10% by weight or more and/or fiber piles of viscose rayon mass-colored with pigments with an uncolored resin in an amount 5 to 20 times as much as an amount of the resin composition and molding a prepared mixture.

DESCRIPTION OF THE PREFERRED EMBODIMENTS

The resin composition for a non-woven fabric-like design of the present invention comprises fiber piles of carbonized polyacrylonitrile having a nitrogen content of 10% by weight or more and/or fiber piles of viscose rayon mass-colored with pigments. The fiber piles of carbonized polyacrylonitrile having a nitrogen content of 10% or more can be obtained by applying a flame resistance treatment and a carbonization treatment to polyacrylonitrile fiber to prepare carbonized polyacrylonitrile fiber, followed by cutting the prepared carbonized polyacrylonitrile fiber to prepare piles. The polyacrylonitrile fiber contains 26.4% by weight of nitrogen. The content of nitrogen increases to some extent by the flame resistance treatment. However, the content of nitrogen gradually decreases as the carbonization treatment proceeds and a carbon fiber in the range of a high strength type containing 4 to 7% by weight of nitrogen to a high modulus type containing almost no nitrogen is obtained. The carbonized polyacrylonitrile fiber used in the present invention can be obtained by stopping the carbonization treatment before the polyacrylonitrile fiber is converted into a carbon fiber, i.e., at a stage in which the content of nitrogen is 10% by weight or more. It is more preferable that the carbonized polyacrylonitrile fiber used in the present invention contains 15% by weight or more of nitrogen.

The fiber piles of carbonized polyacrylonitrile containing 10% by weight or more of nitrogen maintains the original shape without breaking or melting even after two steps of working, i.e., a pelletization step in which a matrix resin, the fiber piles, pigments, antistatic agents and antioxidants for the resin composition are mixed together, extruded and pelletized and a molding step in which the obtained resin composition is mixed with pellets of an uncolored resin and injection molded. The fiber piles are uniformly dispersed in the matrix resin without breaking of strands and can be worked with stability during the pelletizing step in which the resin composition is extruded. The fiber piles are uniformly dispersed also in the molding step in which the resin composition is injection molded. The fiber piles are exposed at the surface of the molded article as black fiber piles and contribute to exhibiting a non-woven fabric-like design.

The fiber piles of viscose rayon mass-colored with pigments can be obtained by dipping and pressing pulp in an aqueous solution of an alkali to prepare alkali cellulose, pulverizing and aging the prepared alkali cellulose, reacting the treated alkali cellulose with carbon disulfide to prepare cellulose xanthate, dissolving the prepared cellulose xanthate into an aqueous solution of sodium hydroxide to prepare a material solution of viscose, mixing the prepared material solution of viscose with pigments, filtering, aging, defoaming and spinning the mixture of the material solution of viscose to obtain viscose rayon fiber and cutting the obtained viscose rayon fiber to prepare piles. It is preferable that the content of the pigments in the colored fiber piles of viscose rayon used in the present invention is 0.01 to 50% by weight, more preferably 0.1 to 5% by weight and most preferably 2 to 3% by weight.

In the present invention, the pigment used for coloring the viscose rayon fiber is not particularly limited. Examples of the pigment include inorganic pigments such as titanium oxide, iron black, iron oxide red, iron blue and carbon black and organic pigments such as polyazo yellow, polyazo red, isoindolinone yellow, diketopyrrolopyrrol, phthalocyanine blue, phthalocyanine green, quinacridone, perylene and anthraquinone.

It is possible that the viscose rayon fiber is colored with a dye in accordance with mass-coloring or piece-dying. However, fiber piles of viscose rayon colored with a dye are inferior to the above fiber piles of viscose rayon colored with pigments of the present invention with respect to heat resistance and weatherability and it is not practical that the fiber piles of viscose rayon colored with a dye are used singly.

The molded article described above which are prepared by using the resin composition of the present invention comprising the fiber piles of carbonized polyacrylonitrile and/or the fiber piles of viscose rayon mass-colored with pigments contains few broken fiber piles and the shape of the fiber piles is excellently maintained after repeated recycling. Thus, the molded article has an excellent property for recycling. When fiber piles of carbon are used in place of the fiber piles of carbonized polyacrylonitrile or the fiber piles of viscose rayon mass-colored with pigments, the fiber piles of carbon in the molded article are broken, the design becomes poor and mechanical properties deteriorate in recycling although the molded article has satisfactory heat resistance and weatherability. Thus, the molded article prepared by using fiber piles of carbon is markedly poor with respect to recycling and it is not practical that fiber piles of carbon are used singly.

In the present invention, where desired, the fiber piles of viscose rayon colored with a dye or the fiber piles of carbon which are described above may be used in a small amount in combination with the fiber piles of carbonized polyacrylonitrile and/ the fiber piles of viscose rayon mass-colored with pigments of the present invention as long as the objects of the present invention are not adversely affected. However, it is preferable that the fiber piles of viscose rayon colored with a dye are not used from the standpoint of heat resistance and weatherability and that the fiber piles of carbon are not used from the standpoint of recycling.

In the present invention, it is preferable that the size of the fiber piles is 1 to 15 denier and more preferably 1 to 4 denier. When the size of the fiber piles is smaller than 1 denier, the fiber piles are not clearly exposed to the surface of a molded article and there is the possibility that the excellent non-woven fabric-like design cannot be exhibited. When the size of the fiber piles exceeds 15 denier, the necessary amount of the fiber piles increases and the amount is economically disadvantageous.

Moreover, the fiber piles are exposed to the surface excessively and there is the possibility that an excellent non-woven fabric-like design is not exhibited. It is preferable that the length of the fiber piles is 0.1 to 2 mm and more preferably 0.2 to 1 mm. When the length of the fiber piles is shorter than 0.1 mm, control of the length is difficult and cost of cutting increases. Therefore, such a length is economically disadvantageous. Moreover, the fiber piles exposed to the surface do not exhibit sufficient visual effects and there is the possibility that the non-woven fabric-like design cannot be exhibited. When the length of the fiber piles exceeds 2 mm, dispersion of the fiber piles in the extruding step deteriorates and there is the possibility that pelletization with stability becomes difficult.

In the resin composition for a non-woven fabric-like design, the composition of the matrix of synthetic resins is not particularly limited and can be suitably selected in accordance with the type of the uncolored resin which is used in combination with the resin composition for a non-woven fabric-like design in mixing and molding. For example, when the uncolored resin is polypropylene, it is preferable that the resin composition for a non-woven fabric-like design contains 15 to 40% by weight of polypropylene, 15 to 40% by weight of polyethylene, 10 to 30% by weight of an ethylene-propylene elastomer, 1 to 10% by weight of polypropylene modified with an acid and 5 to 20% by weight of the fiber piles. When the content of polypropylene is less than 15% by weight, there is the possibility that compatibility with pellets of the uncolored resin is insufficient. When the content of polypropylene exceeds 40% by weight, there is the possibility that dispersion of the fiber piles is poor. When the content of polyethylene is less than 15% by weight, there is the possibility that compatibility with pellets of the uncolored resin is insufficient. When the content of polyethylene exceeds 40% by weight, there is the possibility that dispersion of the fiber piles is poor.

When the content of the ethylene-propylene elastomer is less than 10% by weight, there is the possibility that impact strength of the molded article is insufficient. When the content of the ethylene-propylene elastomer exceeds 30% by weight, there is the possibility that the heat deformation temperature of the molded article is lowered. When the content of polypropylene modified with an acid is less than 1% by weight, there is the possibility that extrusion with stability to produce strands is difficult in the pelletizing step for producing the resin composition. When the content of polypropylene modified with an acid exceeds 10% by weight, there is the possibility that weatherability of the molded article deteriorates. When the content of the fiber piles is less than 5% by weight, the amount of the fiber piles exposed to the surface of the molded article is small and there is the possibility that the excellent non-woven fabric-like design is not exhibited. When the content of the fiber piles exceeds 20% by weight, extrusion with stability to produce strands is difficult in the pelletizing step for producing the resin composition. Moreover, the fiber piles are exposed to the surface of the molded article in an excessive amount and there is the possibility that the obtained design is not suitable as the non-woven fabric-like design.

Polypropylene used in the resin composition of the present invention is not particularly limited. Examples of the polypropylene include isotactic, atactic and syndiotactic propylene homopolymers; ethylene-propylene random copolymers having a small content of the ethylene unit; propylene block copolymers containing a homopolymer portion composed of a propylene homopolymer and a copolymer portion composed of an ethylene-propylene random copolymer having a relatively great content of the ethylene unit; and crystalline propylene-ethylene-($\alpha$-olefin copolymers having a structure which is similar to the above ethylene-propylene block copolymers and contains a copolymerized unit of an $\alpha$-olefin such as butene-1 in the homopolymer portion or in the copolymer portion.

The polyethylene is not particularly limited. Examples of the polyethylene include high density, medium density and low density polyethylenes, linear low density polyethylene, ultra-high molecular weight polyethylene, ethylene-vinyl acetate copolymers and ethylene-ethyl acrylate copolymers. Examples of the ethylene-propylene elastomer include ethylene-propylene rubber (EPR) and ethylene-propylene-diene copolymers (EPDM).

Examples of the polypropylene modified with an acid include polypropylene modified with an unsaturated carboxylic acid or a derivative thereof such as acrylic acid, methacrylic acid, maleic acid, fumaric acid, itaconic acid, maleic anhydride, itaconic anhydride, methyl acrylate, methyl methacrylate, ethyl acrylate, monoethyl maleate, acrylamide, maleic acid monoamide, sodium methacrylate and sodium acrylate by heating in the presence of a radical generator. Maleic anhydride is preferable among these acids, The resin composition for a non-woven fabric-like design of the present invention may further comprise pigments, dispersants, antistatic agents, antioxidants, ultraviolet light absorbents and flame retardants, where necessary.

The relative amounts of the resin composition for a non-woven fabric-like design of the present invention and pellets of the uncolored resin is not particularly limited. It is preferable that the pellets of the uncolored resin in an amount by weight 5 to 50 times, more preferably 10 to 30 times, as much as the amount by weight of the resin composition is mixed with the resin composition. When the amount by weight of the pellets of the uncolored resin is less than 5 times as much as the amount by weight of the resin composition, cost increases to cause economic disadvantage and there is the possibility that the obtained design is not suitable as the non-woven fabric-like design due to excessively dense color tone of the molded article. When the amount by weight of the pellets of the uncolored resin is more than 50 times as much as the amount by weight of the resin composition, the amount of the fiber piles exposed to the surface decreases and there is the possibility that the excellent non-woven fabric-like design is not exhibited.

In the resin composition for a non-woven fabric-like design of the present invention, the fiber piles of carbonized acrylonitrile having a nitrogen content of 10% by weight or more and/or the fiber piles of viscose rayon mass-colored with pigments are kept in the excellently dispersed condition. Therefore, the resin composition can be pelletized with stability without melting or breaking of the fiber piles. The molded article obtained by mixing the resin composition for a non-woven fabric-like design of the present invention with pellets of an uncolored resin and molding the prepared mixture by using a mold having a pattern of fine roughness has the fiber piles exposed to the surface and a rich design exhibiting warmth and depth similarly to non-woven fabrics can be exhibited. In the present invention, the pattern of fine roughness is not particularly limited. Examples of the pattern include a grained pattern of citron (a grained surface pattern imitating the surface of citron fruits) and a fine check pattern. The molded article of the present invention obtained by mixing the resin composition for a non-woven fabric-like design with pellets of an uncolored resin has excellent weatherability such that the color tone shows little change after outdoor exposure for a long time, excellent mechanical properties and properties under heating. The molded article exhibits strength, stability under heating and weatherability which are almost the same as those of molded articles obtained by using pellets of an uncolored resin alone. The molded article has an excellent property for recycling.

The advantages of the present invention can be summarized as follows: In the resin composition for a non-woven fabric-like design of the present invention, the fiber piles of carbonized acrylonitrile having a nitrogen content of 10% by weight or more and/or the fiber piles of viscose rayon mass-colored with pigments are kept in the excellently dispersed condition. Therefore, the resin composition can be pelletized with stability without melting or breaking of the fiber piles while the resin composition is plasticized during molding by melting. The molded article obtained by mixing the resin composition for a non-woven fabric-like design of the present invention with pellets of an uncolored resin and molding the prepared mixture by using a mold having a pattern of fine roughness has the fiber piles exposed to the surface and a rich design exhibiting warmth and depth similarly to non-woven fabrics can be exhibited. The molded article of the present invention obtained by mixing the resin composition for a non-woven fabric-like design with pellets of an uncolored resin has excellent weatherability such that the color tone shows little change after outdoor exposure for a long time, excellent mechanical properties and properties under heating. The molded article exhibits strength, stability under heating and weatherability which are almost the same as those of molded articles obtained by using pellets of an uncolored resin alone. The molded article has an excellent property for recycling.

EXAMPLES

The present invention will be described more specifically with reference to examples in the following. However, the present invention is not limited to the examples.

The properties were evaluated in accordance with the following methods:

(1) Weatherability

The weatherability of an obtained molded article was evaluated by the weathering test using a xenone weathermeter [manufactured by SUGA SHIKENKI Co., Ltd.; XEL-2MNT} and ΔE values after irradiation for 400 hours and 1,000 hours were obtained.

(2) Heat resistance

A resin composition in an amount of 5 parts by weight and 100 parts by weight of a polypropylene composite material were mixed together and the obtained mixture was extruded by an Ioz injection molding machine. Plates were prepared by molding under the conditions of molding temperatures of 200° C., 220° C. and 240° C. and residence times in the cylinder (continuous molding) of 0 minute, 15 minutes and 30 minutes. Difference in color ΔE among the prepared plates was evaluated using the color of the plate prepared under the condition of the molding temperature of 200° C. and the residence time of 0 minute as the reference. When ΔE is 1 or smaller, the heat resistance was evaluated as good (passed) and, when ΔE exceeds 1, the heat resistance was evaluated as poor (failed).

(3) Mechanical properties and heat deformation temperature

A resin composition in an amount of 5 parts by weight and 100 parts by weight of a polypropylene composite material were mixed together and a test piece was prepared. Tensile strength, tensile elongation, bending strength, bending modulus, Izod impact strength and heat deformation temperature of the prepared test piece were measured in accordance with the Standard Test Method of Molded Plastic Materials TSM0501 of the specification of TOYOTA MOTOR Co., Ltd.

(4) Property for recycling

A resin composition in an amount of 5 parts by weight and 100 parts by weight of a polypropylene composite material were mixed together and the obtained mixture was extruded by an extruder of 30 mmϕ at the working temperature of 210° C. to prepare a sample. The obtained sample was referred to as "a sample extruded once". A prescribed amount was removed from the sample and the remaining amount of the sample was extruded again to prepare another sample. This sample was referred to as "a sample extruded twice". In the same manner, "a sample extruded thrice", "a sample extruded four times" and "a sample extruded five time" were prepared. Using the above samples, the length of the fiber piles in the samples and the mechanical properties were measured.

Example 1

Carbonized polyacrylonitrile fiber having a size of 2 denier and a nitrogen content of 20% by weight was obtained by applying the flame resistance treatment and the carbonization treatment to polyacrylonitrile fiber. The obtained carbonized polyacrylonitrile fiber was cut and fiber piles of the carbonized polyacrylonitrile having an average length of 0.5 mm were prepared.

Polypropylene in an amount of 28.3 parts by weight, 28.3 parts by weight of linear low molecular weight polyethylene, 20.0 parts by weight of an ethylene-propylene elastomer, 3.0 parts by weight of polypropylene modified with maleic acid, 12.0 parts by weight of the fiber piles of carbonized polyacrylonitrile obtained above, 6.3 parts by weight of a green pigment for color designing, 1.7 parts by weight of a dispersant, 0.3 part by weight of an antistatic agent and 0.1 part by weight of an antioxidant were mixed together by a tumbler. The obtained mixture was extruded by an extruder to prepare strands and the prepared strands were pelletized by a pelletizer. The mixture could be extruded and pelletized with stability and a resin composition could be obtained.

The obtained resin composition in an amount of 5 parts by weight and 100 parts by weight of a polypropylene composite material were mixed together and the obtained mixture was injection molded using a mold having a grained pattern of citron. At the surface of the obtained molded article having the grained pattern of citron, the black fiber piles were scattered on the green surface having the pattern of fine roughness. The surface thus exhibited a design with warmth and depth similarly to non-woven fabrics. The weatherability of the molded article was obtained by the weathering test.

Using the above resin composition and the polypropylene composite material, various properties were obtained separately. The results are shown in Table 1.

Example 2

Carbon black was mixed with a material solution of viscose rayon. By spinning the obtained mixture, a viscose rayon fiber colored with the pigment which had a size of 3 denier and contained 2.0% by weight of the pigment was obtained. The viscose rayon fiber colored with the pigment was cut and fiber piles of viscose rayon colored black with the pigment which had an average length of 0.5 mm was obtained.

In accordance with the same procedures as those conducted in Example 1 except that the fiber piles colored black with the pigment were used in place of the fiber piles of carbonized polyacrylonitrile, pellets of a resin composition were obtained.

The obtained resin composition in an amount of 5 parts by weight and 100 parts by weight of a polypropylene composite material were mixed together and the obtained mixture was injection molded using a mold having a grained pattern of citron. At the surface of the obtained molded article having the grained pattern of citron, the black fiber piles were scattered on the green surface having the pattern of fine roughness. The surface thus exhibited a design with warmth and depth similarly to non-woven fabrics. The weatherability of the molded article was obtained by the weathering test.

Using the above resin composition and the polypropylene composite material, various properties were obtained separately. The results are shown in Table 1.

Example 3

A pigment [manufactured by DAINICHI SEIKA KOGYO Co., Ltd.; a mixture of PIGMENT YELLOW 95, PIGMENT BROWN 25 and carbon black in a ratio of amounts of 75:25:5] was mixed with a material solution of viscose rayon. The obtained mixture was spun and a viscose rayon fiber colored with the pigments which had a size of 3 denier and contained 2.0% by weight of the pigments was obtained. The viscose rayon fiber colored with the pigments was cut and fiber piles of viscose rayon colored black with the pigments which had an average length of 0.5 mm were obtained.

Polypropylene in an amount of 28.3 parts by weight, 28.3 parts by weight of linear low molecular weight polyethylene, 20.0 parts by weight of an ethylene-propylene elastomer, 3.0 parts by weight of polypropylene modified with maleic acid, 8.0 parts by weight of the fiber piles of viscose rayon colored with the pigment which were obtained above, 4.0 parts by weight of the fiber piles of carbonized polyacrylonitrile obtained in Example 1, 5.6 parts by weight of an ivory pigment for color designing, 1.4 parts by weight of a dispersant, 0.3 part by weight of an antistatic agent and 0.1 part by weight of an antioxidant were mixed together by a tumbler. The obtained mixture was extruded by an extruder to prepare strands and the prepared strands were pelletized by a pelletizer. The mixture could be extruded and pelletized with stability and a resin composition could be obtained.

The obtained resin composition in an amount of 5 parts by weight and 100 parts by weight of a polypropylene composite material were mixed together and the obtained mixture was injection molded using a mold having a grained pattern of citron. At the surface of the obtained molded article having the grained pattern of citron, the black fiber piles were scattered on the ivory surface having the pattern of fine roughness. The surface thus exhibited a design with warmth and depth similarly to non-woven fabrics. The weatherability of the molded article was obtained by the weathering test.

Using the above resin composition and the polypropylene composite material, various properties were obtained separately. The results are shown in Table 1.

Comparative Example 1

By piece-dying viscose rayon fiber having a size of 3 denier with a black dye [trade name: MITSUI SUPER BLACK B; manufactured by MITSUI KAGAKU Co., Ltd.], a black viscose rayon fiber was obtained. The obtained black viscose rayon fiber was cut and fiber piles of viscose rayon colored black with a dye which had an average length of 0.5 mm were obtained.

In accordance with the same procedures as those conducted in Example 1 except that the above fiber piles colored black with a dye were used in place of the fiber piles of carbonized polyacrylonitrile, pellets of a resin composition were obtained.

The obtained resin composition in an amount of 5 parts by weight and 100 parts by weight of a polypropylene composite material were mixed together and the obtained mixture was injection molded using a mold having a grained pattern of citron. At the surface of the obtained molded article having the grained pattern of citron, the black fiber piles were scattered on the green surface having the pattern of fine roughness. The surface thus exhibited a design with warmth and depth similarly to non-woven fabrics. The weatherability of the molded article was obtained by the weathering test.

Using the above resin composition and the polypropylene composite material, various properties were obtained separately. The results are shown in Table 1.

Comparative Example 2

In accordance with the same procedures as those conducted in Example 1 except that fiber piles of carbon having an average length of 0.7 mm were used in place of the fiber piles of carbonized polyacrylonitrile, pellets of a resin composition were obtained.

The obtained resin composition in an amount of 5 parts by weight and 100 parts by weight of a polypropylene composite material were mixed together and the obtained mixture was injection molded using a mold having a grained pattern of citron. At the surface of the obtained molded article having the grained pattern of citron, the black fiber piles were scattered on the green surface having the pattern of fine roughness. However, the black fiber piles were broken into fine fragments although the black fiber piles were present at the surface and the exhibited design was inferior to the design exhibited in Example 1. The weatherability of the molded article was obtained by the weathering test.

Using the above resin composition and the polypropylene composite material, various properties were obtained separately. The results are shown in Table 1.

TABLE 1

| | Example | | | Comparative Example | |
|---|---|---|---|---|---|
| | 1 | 2 | 3 | 1 | 2 |
| Weatherability ΔE | | | | | |
| after 400 hours | 0.45 | 0.50 | 0.20 | 3.50 | 0.42 |
| after 1,000 hours | 0.80 | 1.28 | 0.50 | 6.50 | 0.65 |
| Mechanical properties | | | | | |
| tensile strength (MPa) | 23.2 | 23.2 | 23.2 | 23.2 | 20.5 |
| tensile elongation (%) | 300< | 300< | 300< | 300< | 120 |
| bending strength (MPa) | 34.6 | 34.0 | 34.7 | 34.0 | 33.0 |
| bending modulus (MPa) | 2135 | 2085 | 2126 | 2088 | 1900 |
| Izod impact resistance (J/m) | 346 | 320 | 323 | 320 | 180 |
| Heat deformation temperature (° C.) | 81.8 | 79.2 | 79.7 | 79.2 | 75.0 |
| Heat resistance | | | | | |
| 220° C., 0 minute | good | good | good | good | good |
| 220° C., 15 minutes | good | good | good | good | good |
| 220° C., 30 minutes | good | good | good | poor | good |
| 240° C., 0 minute | good | good | good | good | good |
| 240° C., 15 minutes | good | good | good | poor | good |
| 240° C., 30 minutes | good | fair | fair | poor | good |
| Property for recycling average length of piles (mm) | | | | | |
| extruded once | 0.48 | 0.48 | 0.48 | 0.48 | 0.32 |
| extruded thrice | 0.45 | 0.46 | 0.45 | 0.46 | less than 0.1 |
| extruded 5 times | 0.44 | 0.45 | 0.44 | 0.45 | less than 0.1 |

(Note) The fiber piles of carbonized polyacrylonitrile and the fiber piles of viscose rayon which were used in Examples 1 to 3 and Comparative Example 1 had an average length of 0.5 mm. The fiber piles of carbon used in Comparative Example 2 had an average length of 0.7 mm.

As shown in Table 1, the resin compositions in Examples 1 to 3 all provided the articles exhibiting excellent weatherability, heat resistance and property for recycling. In contrast, the resin composition in Comparative Example 1 in which the piece-dyed fiber piles of viscose rayon were used provided the article exhibiting poor weatherability and heat resistance although the article exhibited the excellent property for recycling. The resin composition in Comparative Example 2 in which the fiber piles of carbon were used provided the article exhibiting the markedly inferior property for recycling although the article exhibited excellent weatherability and heat resistance. The article provided by this resin composition exhibited marked deterioration in the design and the mechanical properties after recycling.

What is claimed is:

1. A resin composition for producing a molded article having a surface which has an appearance of non-woven fabric, which comprises (a) 5 to 20% by weight of fiber piles of a carbonized polyacrylonitrile having a nitrogen content of 10% by weight or more, a size of 1 to 15 denier and a length of 0.1 to 2 mm, (b) 15 to 40% by weight of polypropylene, (c) 15 to 40% by weight of polyethylene, (d) 10 to 30% by weight of an ethylene-propylene elastomer and (e) 1 to 10% by weight of polypropylene modified with an acid.

2. The resin composition according to claim 1, wherein the carbonized polyacrylonitrile has a nitrogen content of 15% by weight or more.

3. A resin composition for producing a molded article having a surface which has an appearance of a non-woven fabric, which comprises 15 to 40% by weight of polypropylene, 15 to 40% by weight of polyethylene, 10 to 30% by weight of an ethylene-propylene elastomer, 1 to 10% by weight of polypropylene modified with an acid and 5 to 20% by weight of fiber piles of viscose rayon which are mass-colored with a pigment.

4. The resin composition according to claim 3, wherein the pigment is in an amount of 0.01 to 50% by weight.

5. A resin composition for producing a molded article having a surface which has an appearance of a non-woven fabric, which comprises (a) fiber piles of a carbonized polyacrylonitrile having a nitrogen content of 10% by weight or more, (b) 15 to 40% by weight of polypropylene, (c) 15 to 40% by weight of polyethylene, (d) 10 to 30% by weight of an ethylene-propylene elastomer, (e) 1 to 10% by weight of polypropylene modified with an acid and (f) 5 to 20% by weight of fiber piles of viscose rayon which are mass-colored with a pigment.

6. A process for producing a molded article having a surface which has an appearance of a non-woven fabric which comprises mixing the resin composition of claim 5, with an uncolored resin in an amount of 5 to 20 times the amount of the resin composition and molding the resultant mixture.

* * * * *

UNITED STATES PATENT AND TRADEMARK OFFICE
CERTIFICATE OF CORRECTION

PATENT NO. : 6,660,372 B1
DATED : December 9, 2003
INVENTOR(S) : Masaki Kondou et al.

It is certified that error appears in the above-identified patent and that said Letters Patent is hereby corrected as shown below:

Title page,
Item [56], References Cited, insert the following:
-- OTHER PUBLICATIONS Derwent Publications, XP-002140891, AN 2000-281260, March 10, 1999, abstract of RU 2,127,287;

Derwent Publications, XP-002140892, AN 1997-13441, October 10, 1999, abstract of RU 2,067,597 --.

Signed and Sealed this

Sixth Day of September, 2005

JON W. DUDAS
*Director of the United States Patent and Trademark Office*